United States Patent [19]

Basov et al.

[11] 4,448,481

[45] May 15, 1984

[54] FIBER OPTIC CLAMP

[75] Inventors: Emma Basov, Des Plaines; Igor Grois, Lincolnwood; Mark Margolin, Chicago; Alan Berg, Wood Dale, all of Ill.

[73] Assignee: TRW Inc., Redondo Beach, Calif.

[21] Appl. No.: 275,846

[22] Filed: Jun. 22, 1981

[51] Int. Cl.³ .............................................. G02B 7/26
[52] U.S. Cl. ................................................. 350/96.20
[58] Field of Search ............... 350/96.20, 96.21, 96.22; 174/191, 197; 24/115 R, 115 G, 120, 128, 130, 132 R, 132 WL, 134 N; 285/125, 236, 242, 243, 420

[56] References Cited

U.S. PATENT DOCUMENTS

| | | | |
|---|---|---|---|
| 2,790,153 | 4/1957 | Arson | 339/184 |
| 4,040,702 | 8/1977 | McKee et al. | 339/97 R |
| 4,050,783 | 9/1977 | Tardy | 350/96.21 |
| 4,113,179 | 9/1978 | McKee | 339/91 R |
| 4,225,214 | 9/1980 | Hodge et al. | 350/96.21 |
| 4,247,163 | 1/1981 | Lumpp et al. | 350/96.21 |
| 4,339,172 | 7/1982 | Leather | 350/96.21 |
| 4,354,731 | 10/1982 | Mouissie | 350/96.20 |

Primary Examiner—John D. Lee
Assistant Examiner—Frank González
Attorney, Agent, or Firm—Neuman, Williams, Anderson & Olson

[57] ABSTRACT

An optical fiber clamp comprises two clamping portions with rounded fiber clamping surfaces for clamping an optical fiber therebetween. Each clamping portion includes a semicylindrical projection which extends normal to the axis of the clamped fiber and is complimentary to the projection of the other clamping portion to form a laterally extending support stud when a fiber is clamped. The stud is inserted in a mounting block to secure the fiber a fixed distance above and parallel to the upper surface of the mounting block. A cantilevered fiber support extends from the first and second clamping portions and comprises a three-quarter round cylindrical section extending from one side of the first clamping portion and a reversed three-quarter round cylindrical section extending from the opposite side of the second clamping portion. The clamping portions are preferably interconnected by a hinge portion in a unitary structure to facilitate wrapping the clamping portions about a fiber.

18 Claims, 23 Drawing Figures

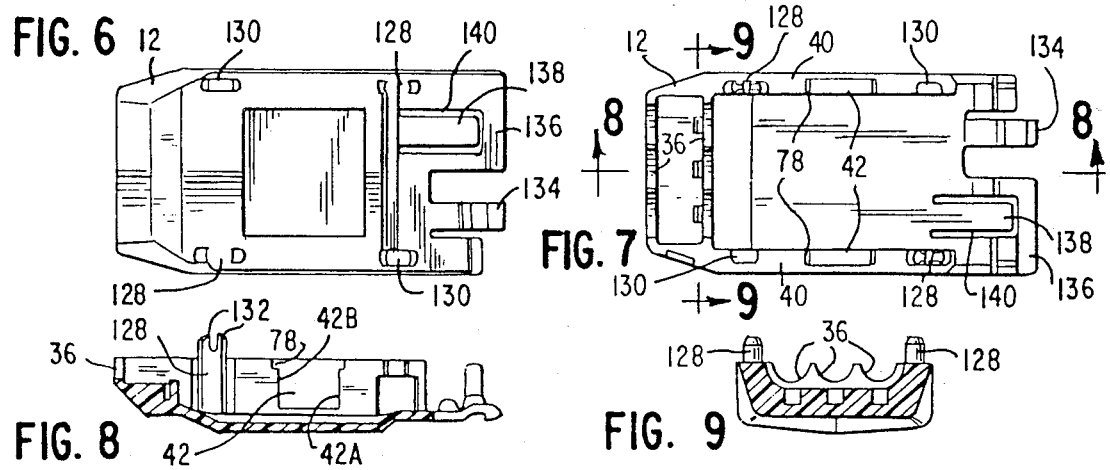
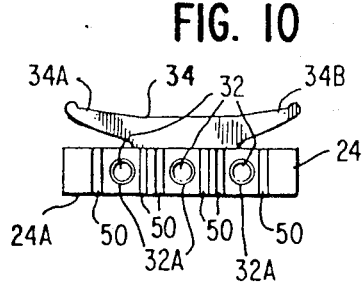
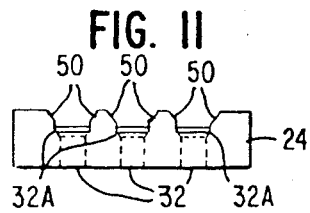
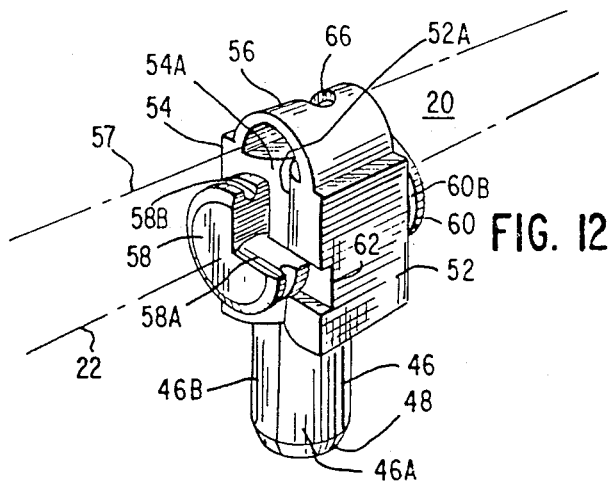
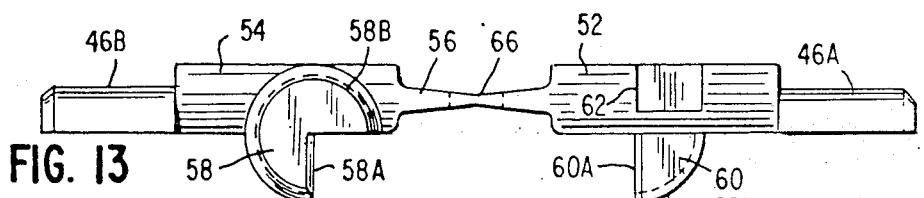
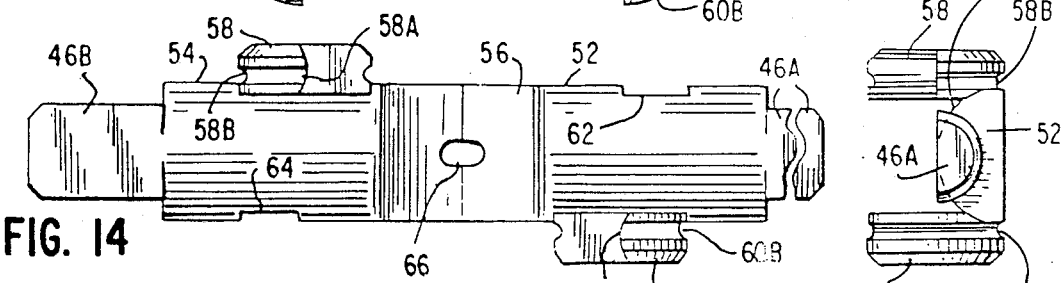
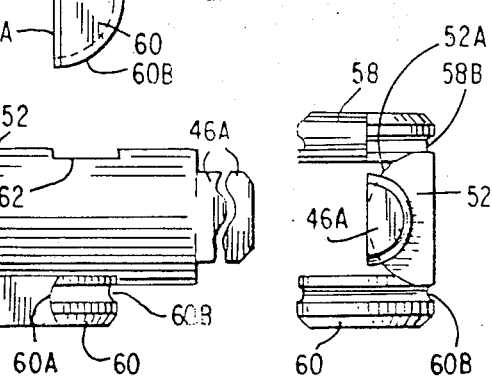

FIBER OPTIC CLAMP

The following copending United States patent applications also disclose connectors as described herein and claim other inventions embodied in such connectors: Ser. No. 275,950 entitled HERMAPHRODITIC CONNECTOR HOUSING HALF SHELLS filed by Igor Grois, Mark Margolin and Alan Berg on June 22, 1981; Ser. No. 275,845 entitled HYBRID OPTICAL/ELECTRICAL CONNECTOR filed by Emma Basov, Igor Grois, Mark Margolin and Alan Berg on June 22, 1981; and Ser. No. 275,844 entitled ARTICULATING FIBER OPTIC CONNECTORS filed by Igor Grois, Mark Margolin and Alan Berg on June 22, 1981. Those application are commonly owned with this application and the subject matter of each of them is incorporated herein by reference.

BACKGROUND OF THE INVENTION

This invention relates to connectors for optical fibers and more particularly to fiber optic clamps for securing fibers within a connector.

In recent years, communications via fiber optics has enjoyed a rapid rate of growth. The advantages of transmission over fiber optic cables include increased capacity and the elimination of undesirable interference and cross-talk which may be present in conventional electrically conducting wire cables. Such optical fibers typically have a small active core area, particularly when employed in long distance applications, and require tightly controlled tolerances for connections which provide minimum loss of transmitted light.

To control the tolerances, fibers must be accurately cut or positioned relative to defined elements within fiber optic connectors so that the ends of two fibers can be accurately positioned relative to one another or contacted with one another with little overtravel. Individual fibers typically are clamped and then cut relative to the clamp. The design of the fiber clamp is very important since the clamp must secure the fiber tightly enough to withstand connecting forces due to abutment of fiber ends but not so tightly as to induce micro bend losses through stress deformation of the fiber. The design of the clamp is further complicated by the minute sizes of the fibers being clamped, e.g., a few thousandths of an inch in diameter for typical optical fibers.

Exemplary of existing fiber clamps is that of an hermaphroditic scissors type clamp which is disclosed in Lumpp and Margolin U.S. Pat. No. 4,247,163.

SUMMARY OF THE INVENTION

An optical fiber clamp in accordance with the present invention comprises first and second clamping portions which are pressed together about a fiber to thereby clamp the fiber between the clamping portions. Each clamping portion includes a semicylindrical projection which is complimentary to the projection of the other clamping portion so that a supporting stud or post is formed when a fiber is clamped. The post is inserted into an aperture of a connector or a mounting block to thereby secure the fiber a fixed distance above and parallel to the upper surface of the mounting block.

The clamping portions include rounded fiber clamping surfaces. The apexes of the rounded surfaces engage and clamp an optical fiber and present smooth surfaces to the fiber to avoid micro bending and the associated losses as the fiber flexes and bends while held by the clamp.

A cantilevered fiber support extends from at least one side of the first and second clamping portions. In the preferred embodiment, the cantilevered support comprises a three-quarter ($\frac{3}{4}$) round cylindrical section extending from one side of the first clamping portion and a reversed three-quarter ($\frac{3}{4}$) round cylindrical section extending from the opposite side of the second clamping portion. When viewed from the front of the clamp along the axis of a clamped fiber, the front cantilevered support structure constitutes a cylindrical section from the three o'clock to twelve o'clock positions at the front of the clamp and the rear support constitutes a cylindrical section from the twelve o'clock to nine o'clock positions at the rear of the clamp.

The fiber supporting surfaces of the cantilevered supports are rounded or semicylindrical to provide smooth but precisely located points of contact with the fiber and insure that the fiber protrudes perpendicular to the clamp in a plane parallel to and above the upper surface plane of the mounting block. Each of the three-quarter ($\frac{3}{4}$) round cylindrical sections includes a groove extending entirely around the external surface of the partial cylinder.

In the preferred embodiment, a hinge portion joins the two clamping portions to facilitate the engagement of a fiber by folding the clamping portions about the hinge portion.

The hinge portion of the clamp interconnecting the two clamping portions includes a centrally located aperture which allows for repositioning an optical fiber which may have become misaligned. A pointed object is inserted into the aperture and a prying action is applied to the pointed object such that the clamping portions are slightly separated from one another. While the clamping portions are thus spread or opened, the fiber can be accurately positioned prior to relieving the prying force to restore the clamping portions to their closed, clamping position.

Advantageously, the preferred embodiment of the optical fiber clamp in accordance with the present invention is constructed as a unitary piece of resilient material with the hinge portion comprising a section of the resilient material which is sufficiently thin relative to the fiber clamping portions to allow hinged movement of the clamping portions. When folded into a fiber clamping position, the structure of the clamp is such that it appears the same whether viewed from the front or the rear along the axis of the clamped fiber. This "symmetry" allows the clamp to be folded about a fiber without special orientation of the clamp relative to the fiber.

BRIEF DESCRIPTION OF THE DRAWINGS

The invention of the present application will be better understood from a review of the detailed description of the invention with reference to the drawings in which:

FIGS. 6 through 9 show top, bottom and sectional views as indicated, respectively, of one of the hermaphroditic connector half shells, two of which form each connector housing.

FIGS. 10 and 11 are a top plan view and a front view respectively of the mounting block used in the hybrid connectors of FIG. 1.

FIG. 12 is a perspective view of a fiber clamp used in the connectors of FIG. 1 in engagement with an optical fiber. The clamp is shown in more detail in FIGS. 13, 14 and 15 which show top, front and side views respectively of the clamp as it is formed prior to being folded into engagement with a fiber as in FIG. 12.

DETAILED DESCRIPTION OF THE ILLUSTRATED EMBODIMENT

Figure 1:
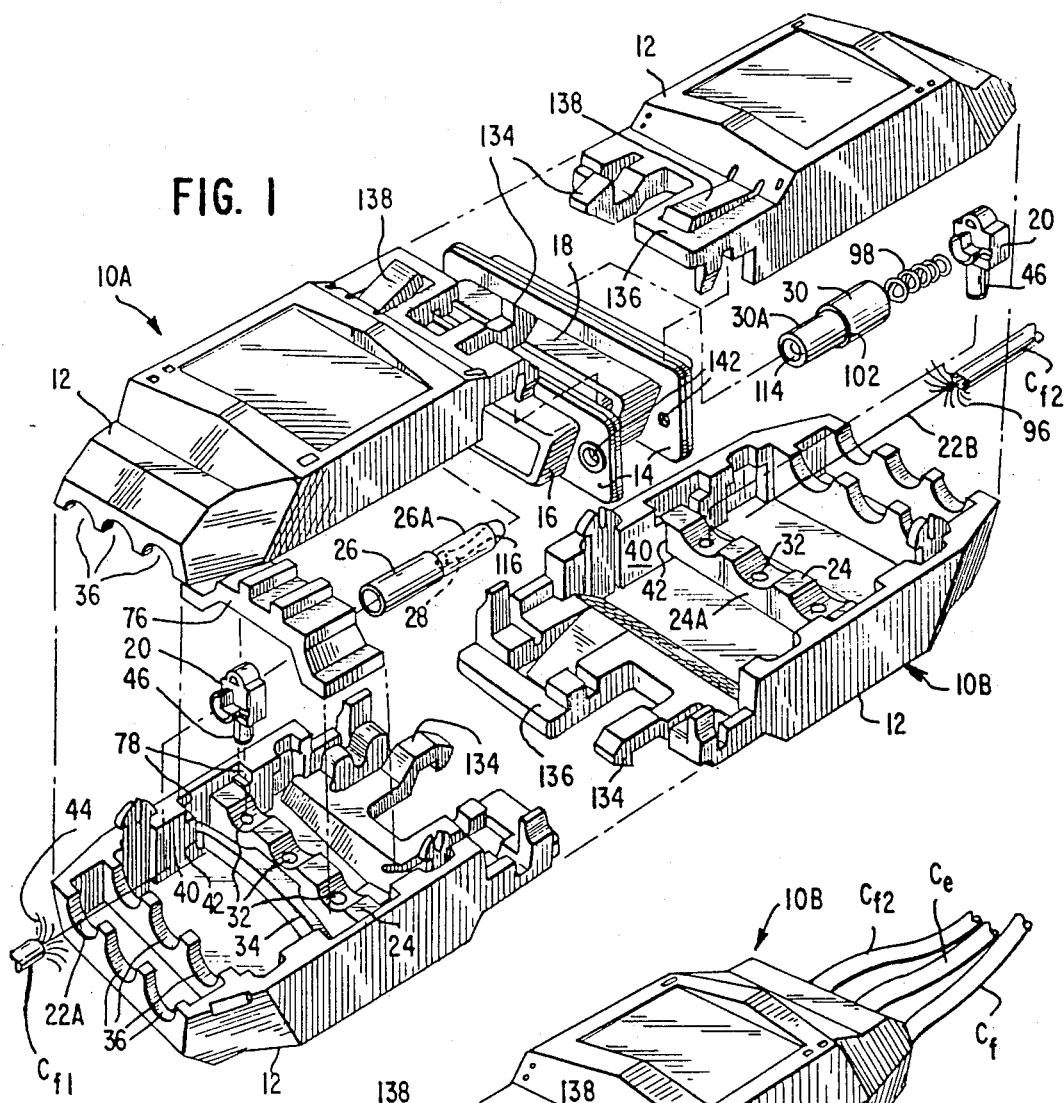
FIG. 1 is an exploded view of two intermateable hybrid connectors employing teachings of the present invention.
Figure 2:
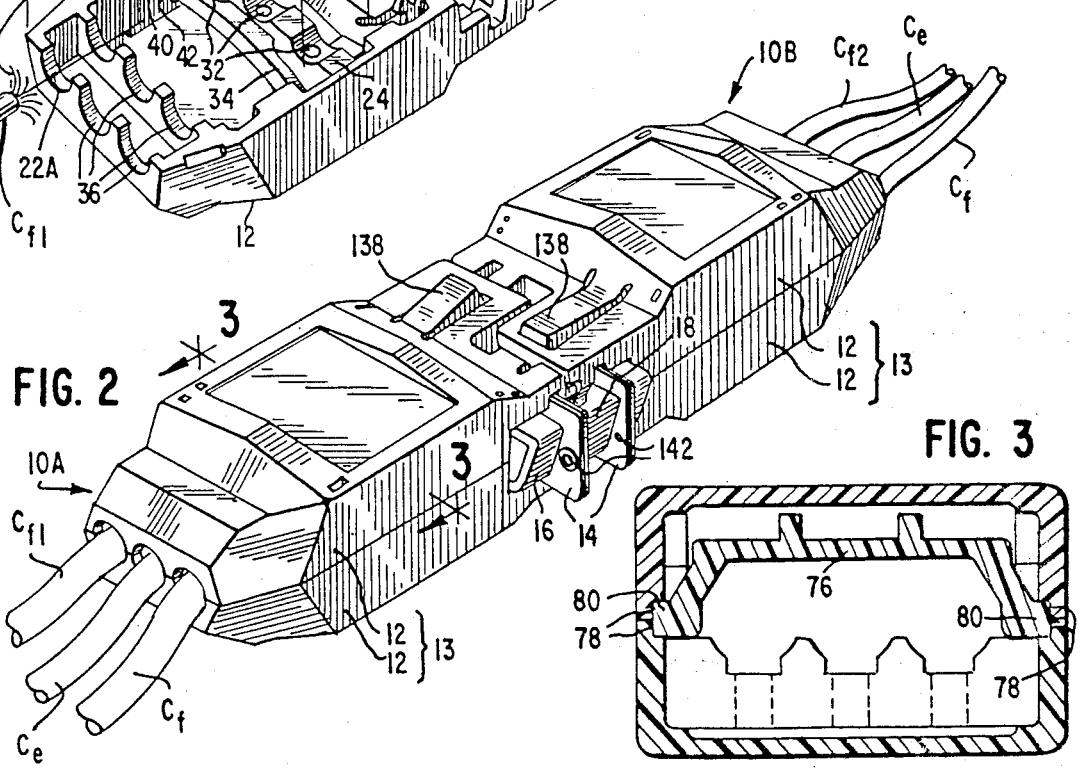
FIG. 2 is a perspective view of the hybrid connectors of FIG. 1 showing the two connector housings in an interconnected position.
Figure 4A:
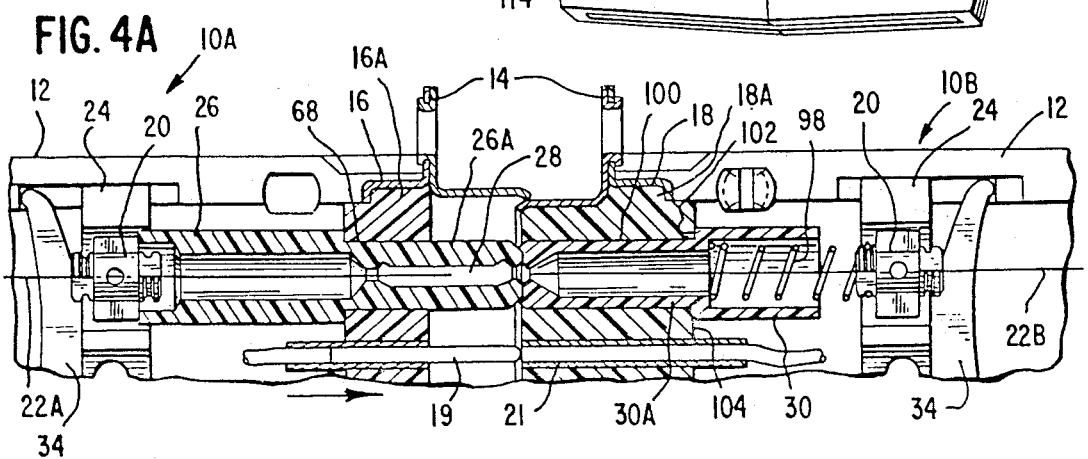
FIGS. 4A and 4B are sectional views of the upper central portion of the connectors as shown in FIG. 4, taken through a fiber optic connection and an electrical connection, in two stages of intermating.
Figure 4B:
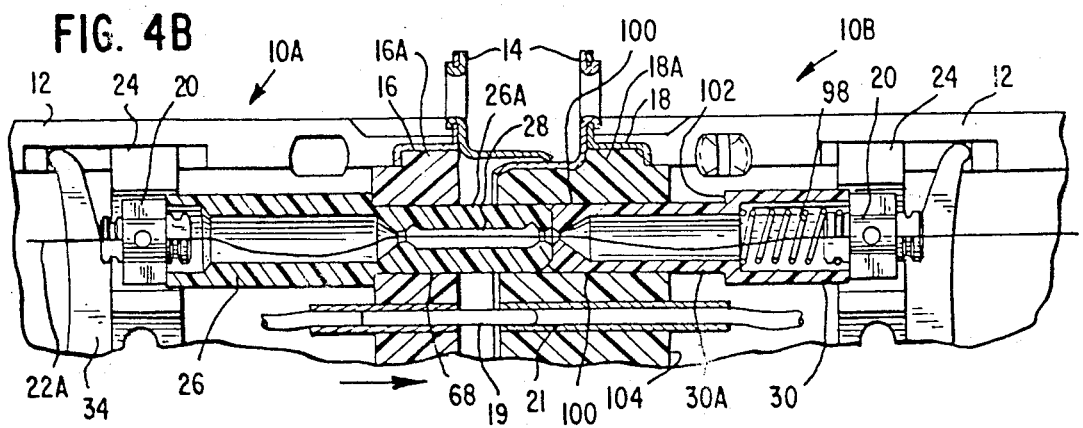
Figure 4:
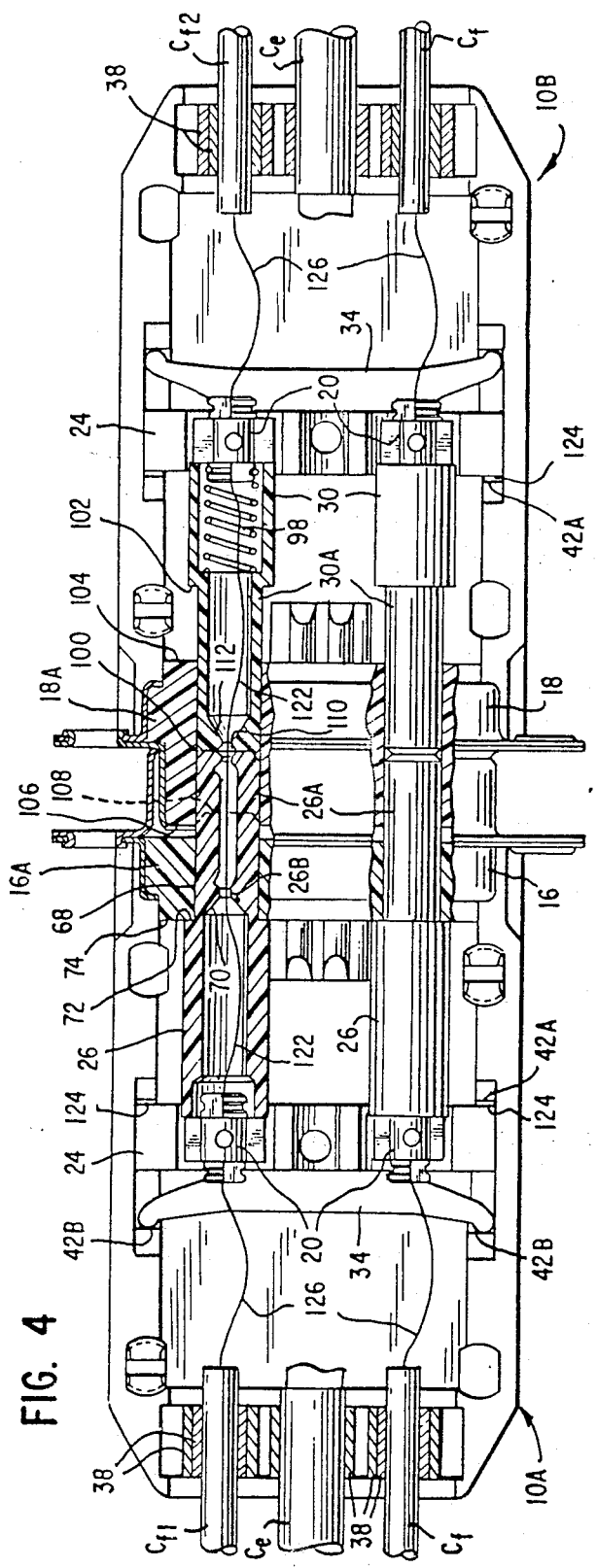
FIG. 4 is a partially sectional plan view of the connectors of FIG. 1.
Figure 5:
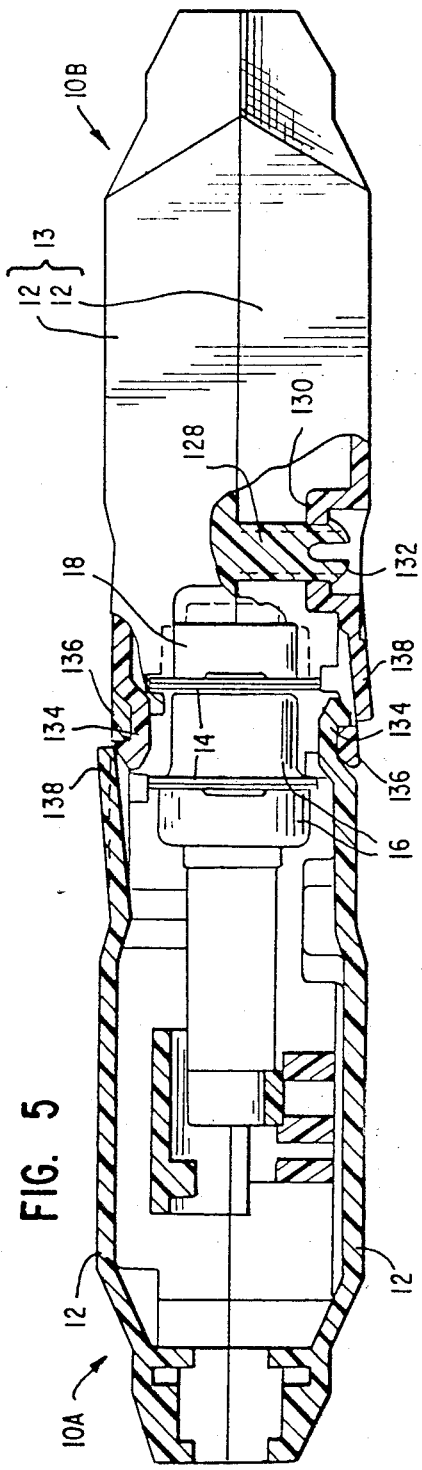
FIG. 5 is a partially sectional side view of the connectors of FIG. 1.
Figure 16:
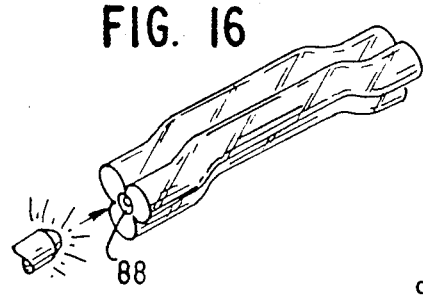
FIG. 16 is a perspective view of one optical fiber guide which may be employed in the hybrid connector of the present invention.

FIG. 1 is an exploded view of the two intermateable hybrid connectors 10A, 10B also shown intermated in FIGS. 2, 4 and 5. The male connector 10A and the female connector 10B are similar, but slightly different in internal assembly, and sometimes are identified generically by the number 10.

Each connector 10 comprises two connector half shells 12 which, in the embodiment illustrated in the drawing, are identical to one another and fully hermaphroditic as will be described in detail hereinafter with reference to FIGS. 6 through 9. The respective connector half shells 12 are joined together to form a housing 13 which engages flanges 14 of one of a pair of intermateable electrical connectors 16, 18.

Each of the connectors 16, 18 may utilize electrical contacts and intermating designs of generally known constructions. For example, they may utilize the illustrated pin and socket contacts 19, 21 (see FIGS. 3A, 3B, 4A, 4B) or ribbon-type contacts, or they may include coaxial cable contacts. Further they may be of a high density multiple contact design, such as the ribbon-type connectors illustrated in McKee et al. U.S. Pat. No. 4,040,702 and McKee U.S. Pat. No. 4,113,179 and which are sold commercially by TRW Inc. of Elk Grove Village, Ill. under the trademarks CINCH RIBBON and SUPERIBBON, or the pin and socket type connectors illustrated in Arson U.S. Pat. No. 2,790,153 and sold by TRW Inc. under the designation CINCH D-Subminiature connectors. The afore-mentioned patents are incorporated herein by reference. The electrical connectors 16 and 18 and their contacts are fully engaged with one another when the hybrid connector assemblies 10 are intermated one to another.

Each of the connectors 10 also includes connector elements for interconnecting optical fibers. These elements include fiber clamps 20, which engage individual fibers 22 and are mounted in movable mounting blocks 24. Connector 10A further includes a fiber receptacle 26 which carries a fiber guide 28, while connector 10B includes a retractable fiber guide piston 30. An optical fiber 22A is held by a clamp 20 which is mounted in an aperture 32 in a mounting block 24 of connector 10A. The fiber 22A extends beyond the clamp 20 and is encompassed by the fiber receptacle 26 which carries the fiber guide 28. The opposing connector 10B includes a fiber 22B which is to be connected to the fiber 22A near the center of the fiber guide 28. The fiber 22B is held by a clamp 20 which is similarly mounted in an aperture 32 of a mounting block 24. The fiber 22B extends beyond the clamp 20 and is encompassed by the spring-loaded retractable piston 30. Each of the electrical connectors 16, 18 is of a configuration to accommodate relative reciprocating movement of the receptacle 26 or piston 30, respectively, in adjacent parallel relation to the intermateable electrical contacts.

As the hybrid connectors 10 are intermated one to the other, the fiber receptacle 26 engages the retractable piston 30 and drives it back towards the associated clamp 20. As the piston 30 is retracted, the respective fiber 22B extends out from the piston 30 and into the fiber guide 28. When the piston 30 is seated against its associated clamp 20, the end of the optical fiber 22B is in light transmissive engagement, e.g., abutment contact, with the end of fiber 22A near the center of the fiber guide 28. Such engagement of the fibers occurs prior to the complete seating of the mating electrical contacts of the electrical connectors 16, 18 which are subsequently completely seated to insure the connection of the electrical contacts of these connectors.

The additional linear motion required to completely seat the electrical contacts of the connectors 16 and 18 could cause damage to the fiber receptacle 26, the retractable piston 30 and/or the fibers 22 within these fiber connecting elements if not properly accommodated. However, flat leaf springs 34 and the movability of the mounting blocks 24 allow advancement of the housings and attached electrical connectors 16, 18 relative to the mounting blocks and the associated clamps. This permits the connectors 16, 18 to become completely seated in intermating relation with one another while protecting the fiber connection and related components. In this way, the connectors 10 provide for the concurrent interconnection between electrical and/or coaxial conductors as well as between opticl fibers by the linear mating engagement of the two unified connector assemblies 10.

The interconnection of the optical fibers 22 is accomplished concurrently and in correlation with but independently of and in isolation from the interconnection of the electrical contacts of the connectors 16, 18 in a single unified connector assembly. Thus the electrical connectors 16, 18 can be manufactured in accordance with standard techniques and existing tolerances for electrical connectors, which are generally much less stringent than the techniques and tolerances for optical fiber connectors. However, the more stringent requirements for optical fiber connectors are obtained in the same connector assembly. Moreover all of the interconnections are effected by a single plug-in motion.

With further reference to FIGS. 1, 4 and 6-9, the outer end walls of the half shells 12, opposite to the mating end walls, form cable receiving clamping scallops 36 which engage and clamp cables entering the connector housings 13 formed when two half shells 12 are coupled together. By clamping cables coming into the housings, such as fiber optic cables $C_f$ and/or electrical cables $C_e$, mechanical strain relief is provided, i.e., strains are transferred from the cables directly to the housing 13 formed by the connector half shells, to minimize strain on the electrical or optical conductors and connections. Various clamping collars or inserts 38, see FIG. 4, may be included for the clamping of cables of different sizes and types. As noted further below, the opposing side walls 40 of each shell are formed with channels 42 for reciprocally mounting the blocks 24.

Fiber cable $C_{f1}$ is composed of a number of concentric sheaths and longitudinally disposed strength members 44 which add tensile strength to the cable and which may comprise plastic or steel filaments. The innermost concentric element of fiber cable $C_{f1}$ comprises an optical fiber 22A which is adapted to convey signals in the normal course of use. Of course, multiple optical fibers may be provided in a single cable.

Each fiber strain relief clamp 20, shown in more detail in FIGS. 12 through 15, is molded as a single piece of plastic material and is hingedly folded to wrap around an optical fiber 22 normal to the axis of the fiber. A clamp 20 clamps, supports and provides strain relief for each individual fiber 22. The lower portion of each strain relief clamp 20 comprises a cylindrical post 46 which is inserted into one of a plurality of apertures 32 in a mounting block 24, see FIGS. 10 and 11. The post 46 extends normal to the axis of a clamped fiber and includes a beveled end portion 48. Each aperture 32 includes a beveled entrance 32A to facilitate entry of the post 46 into one of the respective apertures 32. Placement of a clamp 20 into a mounting block 24 is further enhanced by positioning the apertures 32 within grooves 50 formed in the top of mounting block 24. Posts 46 frictionally engage the apertures 32 to secure the clamps 20 to the mounting blocks 24.

Each clamp 20 includes a first elongate clamping portion 52 and a second elongate clamping portion 54 having clamping ends joined by a flexible hinge portion 56 and opposite or distal ends 46A, 46B of semicylindrical configuration. At their clamping ends, the clamping portions 52 and 54 include rounded fiber clamping surfaces 52A and 54A as best seen in FIGS. 12 and 15. The apexes of rounded surfaces 52A and 54A engage and clamp an optical fiber. The rounded contours present smooth surfaces to a fiber to avoid micro bending and the losses associated with micro bending as optical fibers flex and bend during connector intermating.

Each clamp 20 is foldable at its hinge portion 56 to the folded clamping configuration of FIG. 12. In this clamping configuration, the clamping portions 52, 54 are disposed side-by-side with their distal ends 46A, 46B abutting one another to form the clamp post 46 and their clamping surfaces 52A, 54A disposed in confronting relation to grip therebetween an optical fiber 22 extending transverse to the clamping portions. Clamping portion 54 includes a three-quarter cylindrical projection 58 extending from one side thereof and the clamping portion 52 includes a reversed three-quarter cylindrical projection 60 extending from its opposite side. Clamp portion 52 is provided with a channel 62 to accommodate a portion of the projection 58 when the clamp is folded as shown in FIG. 12. A similar channel 64 in the clamping portion 54 accommodates a portion of the projection 60. When clamp 20 is folded into clamping configuration as shown in FIG. 12, the projection 58 constitutes a three-quarter cylindrical section, extending from the three o'clock to twelve o'clock positions, while the projection 60 constitutes a three-quarter cylindrical section, extending from the twelve o'clock to nine o'clock positions. A review of FIGS. 12 through 15 reveals that clamp 20, when folded, appears the same whether viewed from the front or the back. This "symmetry" facilitates fiber clamping since special orientation of the clamp is unnecessary when folding a clamp about a fiber.

Clamp 20 is hingedly folded about a fiber 22 so that the fiber is engaged by the rounded surfaces 52A and 54A of the clamping portions 52 and 54 as shown in FIG. 12. Post 46 of the clamp then is inserted into one of the apertures 32 in a mounting block 24 to support the clamped fiber in a horizontal position. The fiber is supported at both sides of the clamping portions 52 and 54 by cantilevered support surfaces 58A and 60A formed by the projections 58 and 60. Support surfaces 58A and 60A are rounded, as best seen in FIG. 14, to provide supporting contact with the fiber at two predetermined points to insure that the fiber protrudes perpendicularly from the clamp. Projections 58 and 60 include peripheral grooves 58B and 60B respectively, for spring support purposes as noted further below.

Hinge 56 includes an elongated aperture 66 which provides for convenient adjustment of the position of a fiber after it has been clamped and mounted in the mounting block 24. Adjustment of the fiber may be necessary if it becomes misaligned from the horizontal after clamping. Adjustment is conveniently accomplished by inserting a pointed object (not shown), such as a pin, into aperture 66 and applying a prying force to the pointed object to spread clamping portions 52 and 54 apart. Fiber 22 can then be repositioned before allowing the clamp to return to its clamping position.

Resilient hinge 56 also reduces the required tolerances between post 46 and aperture 32, into which it is fitted, and insures a firm yet gentle clamping of the fiber between clamping portions 52 and 54. If a tight fit between a post 46 and an aperture 32 occurs, hinge 56 permits a slight opening motion of the upper portions of clamping portions 52 and 54 to maintain a firm yet gentle clamping force on the fiber. On the other hand, if the tolerances of a post 46 and an aperture 32 result in a loose yet firm fit, the hinge 56 maintains approximately the same firm yet gentle clamping force on the fiber.

The combination of a mounting block 24 and fiber clamp 20 with a fiber clamped therein, serves as a convenient reference for rapidly and accurately measuring and cutting the fibers for interconnection in the connector of the present invention. The use of this clamp mounting combination also simplifies the requirements for the fiber cutting tool, the assembly of the connectors and the handling of the fibers.

After the fibers have been clamped and cut to the appropriate length relative to the front surface 24A of the respective mounting block 24, the mounting block is ready for insertion into the channels 42 formed in a housing half shell 12. Each mounting block 24 includes a leaf spring portion 34 comprising resilient arms 34A and 34B. Each mounting block 24 and the leaf spring 34 preferably comprise an integral plastic part. The outer ends of the front surface 24A and the outer ends of the arms 34A and 34B frictionally engage the front and rear end shoulders 42A and 42B respectively of the opposed channels 42 which are formed on the inside of side walls 40 of each half shell 12. Each mounting block 24 is dimensioned relative to the length of the respective channels 42 to permit the block to retract or move away from its associated electrical connector by compression of the spring 34 against the rearward end shoulders 42B of the channels. The front end shoulders 42A serve as forward stops to position the block in the shell.

Referring particularly to FIGS. 4, 4A and 4B, a fiber receptacle 26 is fitted over each fiber 22A. An extension 26A of each receptacle then is inserted into an aperture 68 in the male electrical connector 16, and the combination of the mounting block, clamp, fiber, receptacle and electrical connector are inserted into the lower housing half shell. The aperture 68 extends through an insulator body 16A of the connector 16, parallel to the contacts of the electrical connector, and is of a size to accommodate free reciprocating movement of the receptacle extension 26A therein.

Fiber receptacle 26 includes fiber guide 28 in the extension 26A which slidably engages the aperture 68 of the connector 16. The fiber guide 28 can be frictionally inserted into extension 26A or may be imbedded therein during the formation of the receptacle. An aperture 26B formed in receptacle extension 26A, through which the end of optical fiber 22A is threaded to enter fiber guide 28, has an inner tapered entryway 70 to facilitate insertion of the optical fiber into the aperture. The fiber receptacle 26 includes an annular shoulder 72 which engages an inner face 74 of the connector 16. The receptacle extension 26A, which includes the fiber guide 28, extends beyond the outer face of connector 16 to serve as a male mating pin for the optical fiber.

Figure 3:
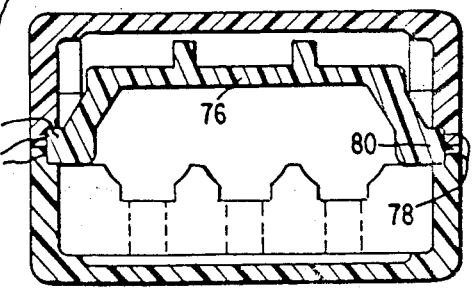
FIG. 3 is a cross-sectional view through one of the connectors of FIG. 2, taken generally along line 3—3.
Figure 3A:
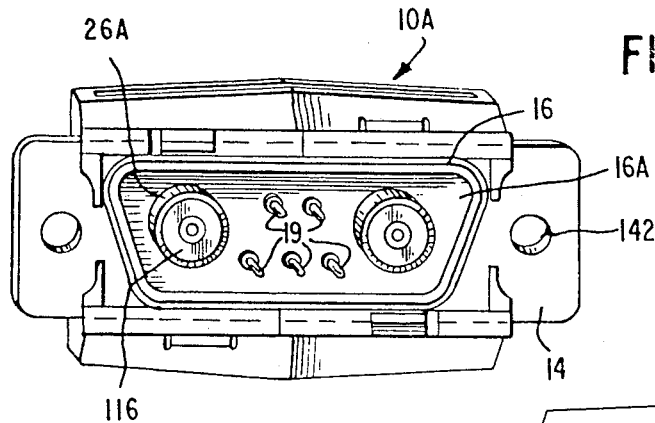
FIGS. 3A and 3B are perspective views of the mating ends of the connectors of FIG. 1.
Figure 3B:
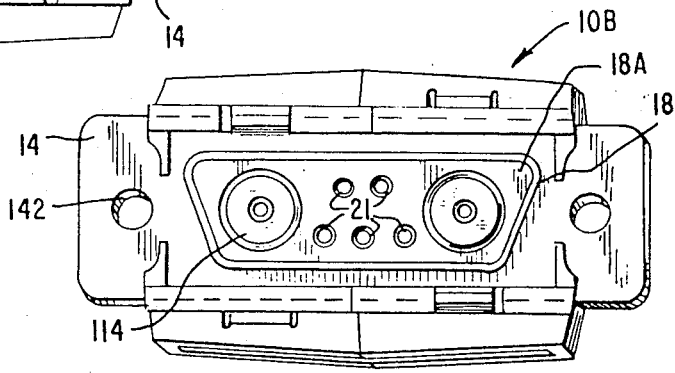

FIG. 3 is a cross-section through the left half connector housing of FIG. 2 along the line 3—3. Wire shield 76 is engaged in channels 78 formed on the inside of side walls 40 of the hermaphroditic connector half shells 12. As shown in FIG. 3, the thickness of edges 80 of shield 76 are double the depth dimension of channels 78 such that shield 76 is securely held within two half shells 12 when they are mated together to form a connector housing 13. Shield 76 provides separation of electrical conductors which go above the shield and optical fibers and optical fiber connecting elements which go beneath the shield. The interconnection of electrical conductors and coaxial cable is via pin and socket connections in accordance with well known techniques and will not be further described in the present application. Perspective view of the mating ends of the connectors 10A and 10B are shown in FIGS. 3A and 3B respectively. FIGS. 3A and 3B clearly show that the illustrated embodiment interconnects five electrical conductors and two optical fibers.

The optical fiber guide 28 employed in the fiber receptacle 26 of FIGS. 1 and 4 is not per se an inventive feature of the hybrid connector. The use of such optical fiber guides is disclosed in U.S. Pat. No. 4,225,214, which is incorporated herein by reference.

Figure 18:
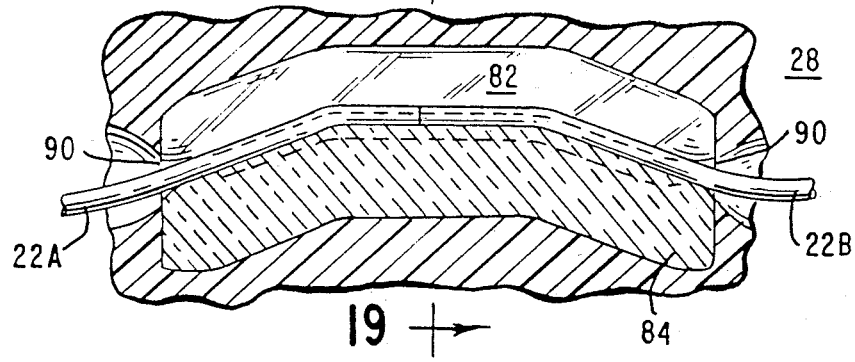
FIG. 18 is an enlarged fragmentary longitudinal sectional view of a fiber guide as in FIG. 16, with abutting fibers therein.
Figure 19:
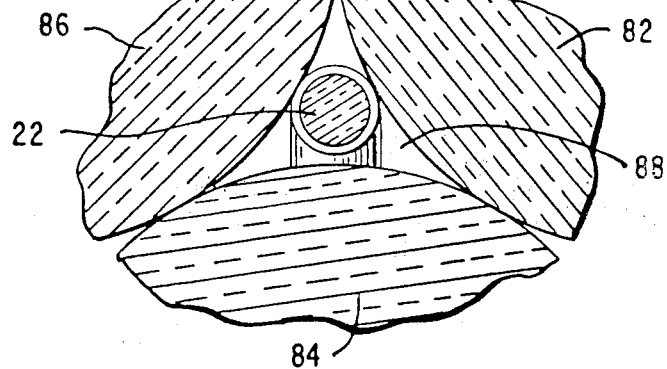
FIG. 19 is a fragmentary transverse sectional view illustrated on an enlarged scale taken on line 19—19 of FIG. 18.

Optical fiber guide 28 as is clearly seen in FIG. 18 comprises an assembly of three or more glass rods such as rods 82, 84 and 86 arranged in side-by-side relationship and parallel to each other. Longitudinal peripheral portions of adjacent rods are in contact and fused together so as to form a cusp-shaped interstitial channel or fiber passageway 88 illustrated in sectional view in FIG. 19. It will be noted from FIG. 18 that the end portions of the rods defining opposed entranceways 90 are of smaller diameter than the remaining rod portions. The entranceways 90 are thus of greater cross-sectional area than the inner interstitial passageway 88. Such enlarged openings at opposed ends of the optical fiber guide 28 facilitate threading or entering of an optical fiber end into the passageway.

Figure 17:
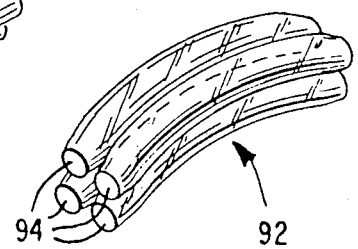
FIG. 17 is a perspective view of another optical fiber guide, employing four guide rods, which may be employed in the hybrid connector.

Whereas FIG. 18 illustrates an optical fiber guide 28 composed of three glass rods 82, 84 and 86, FIG. 17 illustrates an assembly 92 of four glass rods 94 which forms a passageway having four cusps. Also, the rods 94 thereof are formed about a uniform arc. A four rod assembly 92 provides upper and lower cusps as seen in FIG. 17 which facilitates alignment of fiber ends to be connected within the guide. A four-rod assembly having a bent profile as in FIG. 18 is the preferred guide for use in the illustrated embodiment.

After formation, the fiber guide 28 may be molded into extension 26A of receptacle 26 if so desired. The receptacle may be formed of a moldable plastic such as Nylon, ABS, Styrene, Noryl, or a castable plastic such as an epoxy resin. In the course of such molding, care must be taken to plug opposed guide entranceways 90 with a readily removable material so as to insure that no guide passageway portion is plugged in the course of embedding guide 28 in the receptacle extension.

With particular reference to FIGS. 1 and 4, the right-hand housing half shells 12 receive the female electrical connector 18, and a mounting block 24 is mounted into opposed channels 42 of the lower housing half shell 12. Fiber cable $C_{f2}$, including strength members 96, is clamped in scallops of the righthand connector housing. The innermost concentric element of fiber cable $C_{f2}$ comprises optical fiber 22B which is to be placed in contact with fiber 22A. Fiber 22B is clamped by a fiber clamp 20 and the fiber clamp 20 is inserted into an aperture 32 of a mounting block 24 as previously described. After fiber 22B is clamped in the mounting block 24, the fiber is cut to a predetermined length such that it will contact fiber 22A in fiber guide 28 once the connector housings are mated together as shown in FIGS. 2 and 4.

After fiber 22B has been cut to length, spring 98 is fitted over the fiber and engaged with groove 58B of three-quarter ($\frac{3}{4}$) cylindrical projection 58 on clamp 20. The fiber encompassing piston 30 is next fitted over fiber 22B and spring 98. Piston 30 includes extension 30A which extends into an aperture 100 of an insulator body 18A of the connector 18 as shown in FIGS. 4, 4A and 4B. Spring 98 forces piston 30 toward the electrical connector 18 such that an annular shoulder 102 engages inner surface 104 of connector 18 and extension 30A extends to and is approximately flush with outer surface 106 of the insulator body 18A of the connector 18 as shown in FIG. 4A and indicated by the dashed line 108 in FIG. 4.

Aperture 110 of piston 30, through which the end of optical fiber 22B is threaded, has inner tapered entryway 112 to facilitate insertion of the optical fiber into the opening. Entranceway 90 to fiber guide 28 provides room in which the fiber may bend in the course of entering the fiber guide.

The sequence of interconnection for the connectors 10 is shown in FIGS. 4A, 4B and 4. FIGS. 4A and 4B are sectional views of the upper central portion of the connectors 10 of FIG. 4. In FIG. 4A, the initial state of intermating of the connectors is shown. The electrical connectors 16, 18 are aligned with one another and the electrical contacts and optical connecting elements are just touching or in initial mating contact with one another.

As the connectors 10 are mated together to interconnect the electrical connectors 16, 18, a recess 114 in the distal end of piston 30 mates with the conical distal end 116 of fiber receptacle extension 26A which is projecting from the outer face of the electrical connector 16. As the interconnection of the electrical connectors 16, 18 proceeds, fiber receptacle 26 is telescopically received in the aperture 100 of the connector 18 and forces the spring loaded piston 30 to retract toward the respective clamp 20 which spring 98 also engages. Simultaneously with the retraction of piston 30, optical fiber 22B proceeds into entryway 90 of optical fiber guide 28, see FIG. 18. In accordance with well known electrical connector technology, electrical pin contacts 19 of the male connector 16 concurrently engage and are received by electrical socket contacts 21 of the female connector 18.

In FIG. 4B, the electrical connectors 16, 18 are almost completely engaged with one another. The retractable piston 30 seats upon its associated clamp 20 and the end of fiber 22B contacts the end of fiber 22A near the center of fiber guide 28 in the fiber receptacle extension 26A. At this point, the optical fiber connection is complete, under the tolerance control of the lengths of the fibers 22A and 22B extending from the clamps 20 and the lengths of the receptacle 26 and piston 30 extending between the clamps.

Fibers 22A and 22B preferably will have been cut to provide slight excess length as previously described to insure their contact within fiber guide 28. The excess fiber, as compared to the dimension established by the receptacle 26 and piston 30, forms "drip loops" 122 within the receptacle and the piston, as shown in exaggerated scale in FIGS. 4B and 4.

As illustrated in FIG. 4B, the electrical connectors 16, 18 are not fully seated at this stage of interconnection. Accordingly, the integrity of the electrical connection of the contacts for electrical conductors is not yet insured. To complete the connection of the electrical contacts and concomitantly to complete the mechanical joining of the housings 13 of the two assemblies 10A and 10B, a slight additional closing or interconnecting motion of the connectors to their fully intermated condition is required. This motion is accommodated by the movability of the mounting blocks 24 permitted by the springs 34, relative to the housings 13 and the attached electrical connectors 16, 18, whereby the housings and the electrical connectors may be advanced to their fully intermated positions independently of the optical fiber connection, as shown in FIG. 4. The springs 34 preferably are of much greater compressive strength, i.e., much greater modulus of elasticity than the spring 98, whereby the piston 30 normally will seat against the respective clamp 20 to allow completion of the fiber optic connection prior to relative retractive movement of the clamps 20 and blocks 24.

Of course, coil springs or other resilient members can be used to urge the mounting blocks toward their associated connectors. The slight articulation of mounting blocks 24 is indicated by gaps 124 between the end shoulders 42A of channels 42 and the front surface 24a of mounting blocks 24, which gaps are exaggerated in the drawing for illustration. In this regard, the gaps remaining for full seating of the electrical connectors 16, 18 after completion of the optic connections also are exaggerated in FIGS. 4A and 4B, for purpose of illustration.

Fibers 22A and 22B also form drip loops 126 between mounting blocks 24 and the cable clamps at the ends of the housings.

In this manner, both electrical contacts and optical fibers are interconnected by the intermating of two unified hybrid connectors of the present invention.

Each of the connector housings 13 is formed from two half shells 12 to support and retain the components of the respective assembly in their required cooperative relationship to form a unitary hybrid connector. Each housing 13 also provides the means to retain a connector 10 in intermated connection with a cooperative array of electrical contacts and optical fibers, such as in a like connector. One embodiment of the hermaphroditic connector half shells 12 is shown in FIGS. 6 through 9. The illustrated housing half shell structure allows an identical unitary molded part to be used in place of up to four parts to form intermating connector housings. Two of the housing half shells 12 are snapped together to form one connector housing 13 which can, in turn, be snapped together with a like housing, see FIG. 2. Each half shell 12 includes two split posts 128 positioned diagonally opposite to one another and matching snap sockets 130 also positioned diagonally opposite to one another. Each socket 130 receives a split upper extension 132 of the respective post 128 when two of the housing half shells 12 are interconnected face to face.

The connector half shells 12 provides a convenient structure for assembly of the various optical fiber and electrical connecting parts. Once the parts are assembled on a lower half shell, an upper half shell is snapped onto the lower half shell to hold the parts in place and form a connector housing 13. As described above, the resulting housing clamps the cables and mounts both the electrical and the optical fiber connecting elements in their cooperative relationships.

Each connector housing 13 also has two diagonally opposite flexible fingers 134 and snap latches 136 at its mating end. When two connector housings 13 are connected together, the fingers 134 engage the snap latches 136 to securely interconnect the connector housings 13 and the respective components, both electrical and optical.

Cantilever disconnect arms 138 are positioned within slots 140 of each housing half shell 12 with the ends of arms 138 being positioned adjacent to the snap latches 136. Disconnect arms 138 are positioned to permit flexible fingers 134 to engage snap latches 136 as best shown in FIG. 5. Disconnect arms 138 are sufficiently flexible so that they can be depressed by hand pressure to disengage flexible fingers 134 from snap latches 136. Accordingly, two connector housings 13 which have been connected together can be released from one another by applying pressure to the four disconnect arms 138, such as by pressure exerted by the thumbs and index fingers of both hands to both housings 13. Should a more permanent interconnection be desired, a wire, screw, nut and bolt or other fastener can be inserted through apertures 142 of flanges 14 of electrical connectors 16 and 18 to accommodate such permanent interconnection.

For ease of releasing two interlocked connector housings, it may be preferred to provide a single flexible finger and mating latch/disconnect arm at the mating end of the connector housings. Such a simplified, single latch arrangement can be attained by providing two different half shell designs, e.g., one with a finger similar to finger 134 centrally located on its mating end, and one with a latch similar to latch 136 centrally located on its mating end. Two such half shells would be snapped together to form a connector housing in the manner described above.

By joining one such half shell having a finger and one such half shell having a latch to form each connector housing, and properly orienting the respective electrical and fiber optic connector elements therein, any such connector housing containing the male connector elements may be joined with any such connector housing containing the female connector elements. The fingers and latches of the connector housings will assure proper polarization for joining the male and female connectors.

Alternatively, two identical half shells having such fingers thereon could be joined to one another to form one housing, and two identical half shells having such latches thereon could be joined to one another to form another housing. Male connector elements would be placed in one housing and female connector elements would be placed in the other. Each such connector housing thereby would be readily identified as male or female and the orientation of the connector elements in the respective housings would not be critical since the housings would not be polarized. However, polarization would be determined by other means or by the user when mating those connector housings.

Of course, since two different half shell designs are required in a single latch, single finger arrangement, the advantages of inventory reduction, a single molding and reduced potential for confusion during assembly are lost.

From the above description, it is apparent that a unified hybrid connector for concurrently interconnecting both optical fibers and electrical conductors and/or coaxial cables has been achieved which provides an efficient connection via a single assembly. While only an illustrative embodiment has been set forth, alternative embodiments and various modifications will be apparent from the above description to those skilled in the art. For example, coil springs or other resilient members could replace the leaf springs employed on the mounting blocks. Also, alternate interconnecting and interlocking arrangements could be provided between and among the housing half shells. Further, in view of the teachings of the above description, it would be apparent to one skilled in the art that a converse structure having resiliently mounted electrical contacts and fixed optical connecting members could perform the same interconnecting function. Furthermore, the fiber receptacle of the male connector could be spring loaded relative to its fiber clamp similar to the spring loaded mounting of the piston of the female connector. These and other alternatives are considered equivalents and within the spirit and scope of the present invention. While the illustrative embodiment provides for the interconnection of two optical fibers and five electrical conductors, any reasonable number, combination and arrangement of electrical and optical conductors can be accommodated within the teachings of the present invention.

What is claimed is:

1. An optical fiber clamp comprising a pair only of elongate clamping portions disposed in a fiber clamping configuration with said clamping portions situated side-by-side, said clamping portions having clamping ends, clamping surfaces at said clamping ends disposed in confronting clamping relation to one another for clamping an optical fiber therebetween with the fiber extending transverse to said clamping portions, and distal ends disposed side-by-side with their adjacent sides in contact, and means engaging said distal ends only for holding said distal ends in contact and thereby retaining said clamping surfaces in said clamping relation.

2. A clamp as in claim 1 wherein said clamping surfaces are rounded convex surfaces.

3. A clamp as in claim 1 wherein each of said distal ends is of semicylindrical configuration.

4. A clamp as in claim 1 wherein said means engaging said distal ends only is a mounting element containing an opening receiving said distal ends in close-fitting engagement to maintain said clamping surfaces in clamping relation.

5. A clamp as in claim 1 including support projections at opposite sides of said clamping portions having fiber supporting surfaces.

6. A clamp as in claim 5 wherein each of said support projections comprises a three-quarter round cylindrical section oriented when viewed along the axis of a clamped fiber so that one support projection constitutes a cylindrical section extending from the three o'clock position to the twelve o'clock positin and the other support projection constitutes a cylindrical section extending from the twelve o'clock position to the nine o'clock position.

7. A clamp as in claim 5 wherein said fiber supporting surfaces are convex surfaces.

8. A clamp as in claim 1 including a flexible hinge portion integrally joining said clamping ends of said clamping portions, whereby said clamp is foldable at said hinge portion to and from said clamping configuration.

9. A clamp as in claim 8 wherein said hinge portion has an aperture therethrough to receive an implement for separating said clamping surfaces when said clamp occupies said clamping configuration.

10. An optical fiber clamp comprising a pair only of elongate clamping portions having clamping ends, clamping surfaces adjacent said clamping ends, distal ends, and a flexible hinge portion integrally joining said clamping ends of said clamping portions and defining a hinge axis, whereby said clamp may be folded at said hinge portion by essentially relative rotation of said clamping portions substantially about said hinge axis into a fiber clamping configuration wherein said clamping portions are situated side-by-side with said clamping surfaces disposed in confronting clamping relation to one another to clamp an optical fiber between said surfaces with the fiber extending transverse to said clamping portions and with said distal ends disposed side-by-side with their adjacent sides in contact to permit retention of said clamp in said clamping configuration by exerting external forces on said distal ends only to retain said distal ends in contact.

11. A clamp as in claim 10 wherein said distal ends when in contact form a post adapted to be inserted into a mating opening in a mounting element for retaining said distal ends in contact and said clamping surfaces in clamping relation.

12. A clamp as in claim 10 wherein said clamping surfaces are rounded convex surfaces.

13. A clamp as in claim 10 wherein said hinge portion has an aperture therethrough to receive an implement for separating said clamping surfaces when said clamp occupies said clamping configuration.

14. A clamp as in claim 10 wherein each of said distal ends is of semicylindrical configuration.

15. A clamp as in claim 10 including a mounting element containing an opening receiving said distal ends in close-fitting engagement to maintain said clamping surfaces in clamping relation.

16. A clamp as in claim 10 including support projections at opposite sides of said clamping portions having fiber supporting surfaces.

17. A clamp as in claim 16 wherein each of said support projections comprises a three-quarter round cylindrical section oriented when viewed along the axis of a clamped fiber so that one support projection constitutes a cylindrical section extending from the three o'clock position to the twelve o'clock position and the other support projection constitutes a cylindrical section extending from the twelve o'clock position to the nine o'clock position.

18. A clamp as in claim 16 wherein said fiber supporting surfaces are convex surfaces.

* * * * *